United States Patent Office 2,831,832
Patented Apr. 22, 1958

2,831,832

COPOLYESTERS OF A GLYCOL, SULFONYLDI-
BENZOIC ACID AND ω-HYDROXY ACID

John R. Caldwell, Kingsport, Tenn., assignor to Eastman Kodak Company, Rochester, N. Y., a corporation of New Jersey No Drawing. Application September 9, 1954
Serial No. 455,069

18 Claims. (Cl. 260—75)

This invention relates to high melting copolyesters which are suitable for use in preparing films and fibers which can be readily dyed, and is particularly concerned with the preparation of new and improved copolyesters of a glycol, 4,4'-sulfonyldibenzoic acid, and at least one ω-hydroxy acid.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U. S. Patent 2,071,250. The usual polyester fibers, such as those prepared from polyethylene terephthalate, are very difficult to dye, and special methods are usually employed in order to achieve any satisfactory degree of dyeing. Thus, such polyesters must be dyed at superatmospheric pressures with cellulose acetate dyes in order to obtain practical shades. This method is both expensive and time consuming. An alternative process which has been used with such difficultly dyeable polyesters involves the use of a dye assistant or a swelling agent such as phenol, cresol, benzoic acid, dichlorobenzene, or similar material. This process suffered the disadvantage, however, of often causing nonuniform swelling of the fiber with a resultant nonuniform application of the dye. Furthermore, most of the dyeing assistants are objectionable to use because of expense, toxicity, objectionable odor, and similar disadvantages.

Attempts have been made to prepare polymers from ω-hydroxy acids in order to obtain products which can be dyed readily. In most cases, the ω-hydroxy acids were homopolymerized, but the resulting homopolymers had an extremely low melting point and hence were completely unsuitable for use in the manufacture of fibers. Thus, for example, 6-hydroxyhexanoic acid was homopolymerized by Van Natta, Hill and Carothers (J. Am. Chem. Soc., 56, 455 (1934)) but the resulting homopolymer melted at 53–55° C. Carothers and Van Natta also polymerized ω-hydroxydecanoic acid (J. Am. Chem. Soc., 55, 4714 (1933)) but the resulting homopolymer melted at 75–80° C. It is thus apparent that the ω-hydroxy aliphatic straight chain acids give polyesters which melt considerably below 100° C. In the preparation of synthetic fibers, the polymer, in order to be satisfactory, must melt above about 150° C. and preferably above about 200° C. Consequently, the ω-hydroxy acids have not found utility in the preparation of polymers for the manufacture of films and fibers, but the increased dyeability has been obtained by other methods.

It is accordingly an object of this invention to provide new and improved linear copolyesters which have improved dye affinity, especially for cellulose acetate dyes, and which have high melting points of the order of 200° C. or higher.

It is another object of the invention to provide new polyesters containing a substantial proportion of ω-hydroxy acid but which are not subject to the disadvantages normally inherent in polyesters of ω-hydroxy acids, such as low melting point and low sticking temperature.

Another object of the invention is to prepare high melting polyesters having improved utility for the manufacture of fibers, films and molded objects.

Other objects will be apparent from the description and claims which follow.

These and other objects are attained by means of this invention wherein new and improved copolyesters are prepared by coreacting a glycol containing 2–12 carbon atoms with acidic material consisting of 30–85 mole percent of 4,4'-sulfonyldibenzoic acid and 70–15 mole percent of at least one ω-hydroxy acid selected from the group consisting of glycolic acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid, and 11-hydroxyundecanoic acid. The resulting copolyesters show greatly improved dye affinity and quite unexpectedly have melting points above 200° C. even when as much as 70 mole percent of the acidic components consists of ω-hydroxy acid. Thus the copolyesters have greatly improved dyeing properties without sacrificing the desirable high melting point, tensile strength, elongation, or elastic recovery which characterizes unmodified glycol-sulfonyldibenzoic acid polyesters. Thus the copolyesters embodying the invention are of particular utility in the manufacture of high strength synthetic fibers and are also of value in the manufacture of photographic film base, electrical insulating sheets, protective wrapping sheets, and molded objects.

The copolyesters embodying the invention are readily prepared in the same manner as are unmodified polyesters prepared from a glycol and a single polybasic acid. Thus, the copolyesters of the invention are readily prepared by heating a mixture of the glycol and the acidic components, preferably in ester form in the presence of a polymerization catalyst. Desirably, the glycol is employed in an amount which is at least equivalent to the amount of 4,4'-sulfonyldibenzoic acid and desirably in excess on a molar equivalent basis, as for example, 25–100 mole percent excess of glycol. The copolyester formation is facilitated by the use of a condensation catalyst and preferably an ogano-metallic catalyst, a large number of which are described in the copending applications of John R. Caldwell, Serial Nos. 313,061 through 313,071, inclusive, filed October 3, 1952. The catalysts which are preferred for use in practicing this invention are the titanium compounds specifically disclosed in application Serial No. 313,072, tin compounds as disclosed in application Serial No. 313,078, and aluminum compounds as disclosed in application Serial No. 313,077. In accordance with usual practice, especially when such catalysts are employed, the esterified acids and/or esterified glycols can be readily used instead of the free acids and free glycols. The catalyst is desirably employed in an amount of from 0.005% to 0.01% but preferably from 0.006% to 0.008%, based on the weight of the polyester reactants. The copolyester formation is effectively between the glycol, the 4,4'-sulfonyldibenzoic acid, and the ω-hydroxy acid, whether such glycols and acids are introduced in free or esterified form. Consequently, it will be understood that the term "glycol" and the term "acid" as employed herein and in the appended claims describe the actual reactants in situ, such reactants in situ being the same with the introduction initially of the alkyl esters of the glycols and acids as well as the unesterified compounds. The alkyl esters which are preferably employed are those wherein the alkyl group contains 1–6 carbon atoms.

The ω-hydroxy acid can be any one or more of the acids selected from the group consisting of glycolic acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid. The acids containing 4 or 5 carbon atoms are not used in practicing the invention because they tend to form lactones and distill from the reaction mixture. The preferred hydroxy acids are hydroxypivalic acid and 6-hydroxyhexanoic acid, although the other acids as enumerated hereinabove can be used with somewhat less advantageous results. The hydroxy acid is used in an amount of from 15 to 70 mole percent of the combined weight of hydroxy acid and sulfonyldibenzoic acid and preferably in an amount of 20–50 mole percent based on the combined acid weight.

The 4,4'-sulfonyldibenzoic acid which is employed in conjunction with the hydroxy acid conversely forms 30–85 mole percent of the combined weight of acid components and preferably 50–80 mole percent of the acidic material. The sulfonyl dibenzoic acid can be employed in either free or esterified form with the alkyl esters containing 1–6 carbon atoms in the alkyl group being preferred. The hydroxy acid, being a bifunctional reactant containing as the functional groups a hydroxy group and a carboxyl group, functions both as an alcohol and an acid. In contrast to this, the dibasic sulfonyldibenzoic acid condenses with an equivalent amount of glycol and hence the glycol and sulfonyldibenzoic acid are employed in amounts wherein the glycol is at least equivalent to the sulfonyl dibenzoic acid.

Any of the well known glycols containing 2–12 carbon atoms can be used in practicing the invention. The glycols which are preferably employed are the polymethylene glycols containing 2–10 carbon atoms such as ethylene glycol, trimethylene glycol, tetramethylene glycol, pentamethylene glycol, hexamethylene glycol, octamethylene glycol, and decamethylene glycol; although ether glycols such as diethylene glycol, or branched-chain glycols, such as 2,2-dimethyl-1,3-propanediol or 2,2-dimethyl-1,4-butanediol can be used with good results. The polyhydric alcohols containing three or more hydroxy groups are usually not employed since they function as cross-linking agents, and it is ordinarily desired to form linear polymers free of cross-linking. The glycol is employed in an amount sufficient to react with the sulfonyldibenzoic acid and, in accordance with usual practice, a 25–100 mole percent excess of the glycol is usually employed. The excess glycol is distilled out during the course of the polymerization reaction and, although not necessary, it does serve to facilitate the course of the polymerization.

In forming the copolyesters of this invention, it is usually desirable to carry out the reaction in two stages. The first stage of the reaction is carried out by heating a mixture of the glycol, 4,4'-sulfonyldibenzoic ester, and ω-hydroxy acid in the presence of a condensation catalyst at a temperature of 180°–230° C. and atmospheric pressure, whereby low-molecular weight glycol esters are formed and the alcohol liberated by ester interchange is distilled out. During this initial stage as well as during the subsequent polymerization, oxygen and moisture are excluded from the reaction vessel. The second stage of the reaction can be carried out either by melt polymerization or by a solid-phase process. In the former method, the temperature of the reaction mixture is raised to 250–300° C. depending upon the melting point of the polyester. Some of the excess glycol is distilled off at this time. The reaction mixture is then subjected to vacuum and the heating above the melting point is continued with agitation of the mixture in order to facilitate the escape of volatile products from the highly viscous melt. The heating is carried on until the resulting polymer forms a fiber when the surface of the melt is touched with a rod and the rod pulled away so as to pull a fiber out of the melt. Ordinarily, the polymerization is carried out until the polymer thus formed has an inherent viscosity of at least 0.4 and desirably at least 0.6.

In an alternative process, the second stage of the reaction can be carried out by the solid-phase process. When this method is used, a prepolymer having an inherent viscosity of 0.15 to 0.30 is prepared by stirring the reaction mixture under vacuum as described hereinabove. This prepolymer is then removed from the reaction vessel and pulverized to a particle size of about 0.01–0.03 inch. The pulverized prepolymer is then heated in vacuum at a temperature below its melting point or in an inert-gas stream at such temperature. The temperature employed is usually in the range of 200–260° C. depending upon the melting point of the copolyester. As before, the polymerization is carried on until the resulting copolyester has an inherent viscosity of at least 0.4 and desirably at least 0.6.

The resulting copolyesters prepared in accordance with this invention are highly valuable for the manufacture of fibers, films and molded objects. Fibers are readily prepared from the polymer by the usual melt-spinning or solvent-spinning processes, and the fibers thereby obtained possess the highly advantageous combination of characteristics of having a melting point well above 200° C., a sticking temperature of at least about 200° C. excellent dyeability, high tensile strength, and good elongation and elastic recovery. Such improved results are obtained even when the hydroxy acid is employed in an amount of as much as 70 mole percent based on the combined weight of the acids, although an amount of hydroxy acid of from 20–50 mole percent is desirably employed in most cases. Because of the excellent mechanical properties and high melting points, the copolyesters of the invention are also useful in preparation of molded objects in accordance with usual molding practice or in the formation of other shaped objects such as films, sheets, and the like by extrusion or casting methods which are applicable to polyesters generally. Films prepared from the copolyesters of the invention find excellent utility as photographic film base for either black-and-white or color film. Thus, the copolyesters are useful as support layers for bearing photosensitive emulsions such as silver halide emulsions. In film form, the copolyesters of the invention are also useful as electrical insulating sheets and as protective wrappings.

The invention is illustrated by the following examples of preferred embodiments thereof, although it will be understood that the examples are included for purposes of illustration and are not intended to limit the scope of the invention unless otherwise specifically indicated.

*Example 1*

A charge of one molar proportion of 4,4'-sulfonyldibenzoic acid dibutyl ester, 0.25 molar proportion of ethyl 6-hydroxyhexanoate and 1.5 molar proportions of pentamethylene glycol was introduced into a reaction vessel equipped with a stirrer, a distillation column, and an inlet tube for purified nitrogen. A solution of 0.1 part by weight of sodium titanium butoxide in 5 volumes of butyl alcohol was added as catalyst. The resulting mixture was stirred at 200–210° C. in a stream of purified nitrogen, and a mixture of ethyl and butyl alcohol was distilled off as the ester interchange proceeded. The distillation of the alcohols practically ceased after one hour. The temperature was then raised to 270–280° C. and held for 30 minutes, during which time excess glycol was distilled off. A vacuum of 0.1 mm. was then applied, and the mixture was stirred at 270–280° C. for 1 hour. A colorless polyester having an inherent viscosity of 0.85 as measured in a mixture of 60 parts phenol and 40 parts tetrachloroethane was obtained. The melting point of the crystalline polymer, as determined on the hot stage of a polarizing microscope, was 260–265° C.

Fibers were spun by extruding the melted copolyester through a multi-hole spinnerette. After drafting and heat-setting, the fibers had a hot bar sticking temperature of 220–230° C. These fibers dyed to dark shades with cellulose acetate dyes at the boil. The polymer was also useful as a photographic film base.

*Example 2*

Similarly improved results are obtained as in the preceeding example when the acid components are employed in substantially equimolar proportions. Thus a copolyester was prepared in accordance with the process of Example 1, having the composition of 0.5 mole of 6-hydroxyhexanoic acid, 0.5 mole of 4,4'-sulfonyldibenzoic acid, and 0.5 mole of pentamethylene glycol in combined form. The product had a crystalline melting point of 230–240° C. and gave strong elastic fibers that had a sticking temperature of 200–205° C. The fibers dyed well with cellulose acetate dyes. Because of its excellent flow properties, this copolyester was particularly valuable as a plastic for injection molding. Thus, as can be seen, when the amount of hydroxy acid is equivalent to the amount of sulfonyldibenzoic acid, the melting point of the resulting copolyester is still 230–240° C. as compared to a melting point of 54–55° C. for a homopolymer of 6-hydroxyhexanoic acid. Thus the dyeability is increased by the presence of the hydroxy acid while the other characteristics imparted by the 4,4'-sulfonyldibenzoic acid are not dimished to any objectionable degree.

*Example 3*

As has been indicated, any of the glycols containing 2–12 carbon atoms, and preferably the polymethylene glycols of 2–10 carbon atoms, can be employed with equally good results. Thus, using the procedure set out in Example 1, a copolyester was prepared having the composition 0.5 mole of 6-hydroxyhexanoic acid, 0.5 mole of 4,4'-sulfonyldibenzoic acid, and 0.5 mole of tetramethylene glycol, all in combined form. The resulting crystalline copolyester melted at 275–280° C., which is much higher than would be predicted for a polymer containing 50 mole percent of hydroxyhexanoic acid which in the homopolymeric form has a melting point of about 55° C. Although the copolyesters of this invention have high melting points, they can be readily used for injection molding plastics since they melt without objectionable decomposition. The copolyester of this example was especially valuable for the production of strong elastic fibers which had a hot bar sticking temperature of 230–240° C.

*Example 4*

As has been indicated, the hydroxy acid can be used in as much as 70 mole percent based on the combined weight of the hydroxy acid and sulfonyldibenzoic acid. A copolyester was made from 0.7 mole of 6-hydroxyhexanoic acid, 0.3 mole of 4,4'-sulfonyldibenzoic acid, and 0.3 mole of tetramethylene glycol by the process described in Example 1. Although the copolyester thus obtained contained 70 mole percent of hydroxyhexanoic acid, it had a crystalline melting point of 250–260° C. The product was especially valuable as a plastic for injection molding.

*Example 5*

Similarly improved results are obtained with other ω-hydroxy acids as herein defined. Particularly good results are obtained with the 6-hydroxyhexanoic acid or with hydroxypivalic acid. Thus a copolyester was prepared having the composition of 0.5 mole of hydroxypivalic acid, 0.5 mole of 4,4'-sulfonyldibenzoic acid, and 0.5 mole of tetramethylene glycol in combined form. The resulting polymer had a crystalline melting point of 275–280° C. and gave strong elastic fibers that had a hot bar sticking temperature of 240° C. The fibers dyed heavily with cellulose acetate dyes.

*Example 6*

As with the hydroxyhexanoic acid, hydroxypivalic acid or any of the other ω-hydroxy acids herein defined give high-melting copolyesters even when the hydroxy acid is a major component of the mixture of acids employed. Thus, a copolyester was made from 0.6 mole of hydroxypivalic acid, 0.4 mole of 4,4'-sulfonyldibenzoic acid, and 0.4 mole of tetramethylene glycol. The resulting copolyester melted at 240–250° C. and gave fibers which had a sticking temperature of 210° C. The fibers dyed heavily with cellulose acetate dyes. The polymer was also useful as a molding plastic and as an electrical insulating material.

*Example 7*

The high melting point characteristics are retained in polymers which contain a major proportion of the hydroxy acid even when a low molecular weight glycol such as ethylene glycol is employed. Thus, a copolyester was prepared from 0.6 mole of 6-hydroxycaproic acid, 0.4 mole of 4,4'-sulfonyldibenzoic acid, and 0.4 mole of ethylene glycol. This copolyester melted at 240–250° C. and gave strong elastic fibers that dyed heavily with cellulose acetate dyes. In this example, as in the other examples wherein the copolymer composition is given, the glycol is normally employed in an excess over the molar equivalent amount necessary to react with the sulfonyldibenzoic acid, although only equivalent amounts of the glycol and sulfonyldibenzoic acid appear in the final copolyester. Likewise, the acids can be employed in free form but are usually employed in the form of alkyl esters. Since the ester groups themselves take no direct part in the reaction and are distilled off in the form of the alcohol in the initial stages of the reaction, the condensation is effectively between the acids and the glycol, regardless of whether the esters are employed for the initial charging to the process.

*Example 8*

As has been indicated hereinabove, the copolyesters can be prepared entirely in a melt process, or they can be prepared in a solid-phase process as described. Thus, 420 g. (1.0 mole) of 4,4'-sulfonyldibenzoic acid dibutyl ester, 200 g. (1.5 moles) of butyl glycolate, and 180 g. (1.5 moles) of hexamethylene glycol were placed in a reaction vessel as described in Example 1. A solution of 0.25 g. of potassium titanium butoxide in 10 cc. of butyl alcohol was added as catalyst. The mixture was stirred at 170–180° C. in a stream of pure nitrogen for one hour, and the temperature was then raised to 190–200° C. and held for 3 hours to remove the butyl alcohol. The temperature was then raised to 230–240° C. and held for 30 minutes. A vacuum was applied, and stirring was continued until the melt solidified in about 20 minutes. The solid prepolymer thus obtained was removed from the reaction vessel and granulated to a particle size of 0.01–0.03 inch. The granulated prepolymer was then polymerized in the solid state by heating in a vacuum at 220–230° C. for four hours. The resulting product had an inherent viscosity of 0.74 when measured in a solution of 60 phenol-40 tetrachloroethane. The copolyester melted at 260–270° C. and gave strong elastic fibers that dyed well with cellulose acetate dyes.

*Example 9*

A copolyester was made in similar fashion having the composition 0.5 mole of 9-hydroxynonanoic acid, 0.5 mole of 4,4'-sulfonyldibenzoic acid, and 0.5 mole of trimethylene glycol in combined form. The resulting copolyester was useful as a molding plastic and for the production of photographic film base and synethetic fibers.

Example 10

A similar copolyester was prepared having the composition in combined form of 0.8 mole of 4,4'-sulfonyldibenzoic acid, 0.2 mole of hydroxypivalic acid, and 0.8 mole of pentanediol. The resulting polymer melted at 250–260° C. Although the copolyester contained only 25 mole percent of hydroxy acid, the fibers obtained from the polymer dyed heavily with cellulose acetate dyes. As with the other copolyesters embodying the invention, this polymer was also useful as a photographic film base and as a molding plastic.

Thus by means of this invention a new and highly useful class of copolyesters is readily prepared, and the polymers thus obtained possess the beneficial properties imparted by all of the components without suffering the corresponding disadvantages which might be expected. The copolyesters can be prepared by either batch or continuous processes as desired, and the method of preparation can be varied in accordance with usual practices for preparing polyesters. If desired, the polyesters can be compounded with other polyesters, or other extenders, additives, fillers, pigments, and similar compounding ingredients. The composition of the copolyesters embodying this invention can be varied over the ranges defined herein and using any of the combinations of hydroxy acid, glycol, and sulfonyldibenzoic acid with excellent results. Ordinarily, only a single hydroxy acid is employed, although two or more hydroxy acids can be employed within the scope of the invention if desired.

Although the invention has been described in considerable detail with particular reference to certain preferred embodiments thereof, it will be understood that variations and modifications can be effected without departing from the spirit and scope of the invention as described hereinabove and as defined in the appended claims.

I claim:

1. A copolyester obtained by the simultaneous coreaction of a glycol containing 2–12 carbon atoms, and acidic material consisting of 30–85 mole percent of 4,4'-sulfonyldibenzoic acid and 70–15 mole percent of ω-hydroxy acid selected from the group consisting of glycolic acid, hydroxy-pivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

2. A copolyester obtained by the simultaneous coreaction of a glycol containing 2–12 carbon atoms, and acidic material consisting of 50–80 mole percent of 4,4'-sulfonyldibenzoic acid and 50–20 mole percent of ω-hydroxy acid selected from the group consisting of glycolic acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

3. A copolyester obtained by the simultaneous coreaction of a glycol containing 2–12 carbon atoms and acidic material consisting of 30–85 mole percent of 4,4'-sulfonyldibenzoic acid and 70–15 mole percent of hydroxypivalic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

4. A copolyester obtained by the simultaneous coreaction of a glycol containing 2–12 carbon atoms and acidic material consisting of 30–85 mole percent of 4,4'-sulfonyldibenzoic acid and 70–15 mole percent of 6-hydroxyhexanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

5. A copolyester obtained by the simultaneous coreaction of a polymethylene glycol of 2–10 carbon atoms, and acidic material consisting of 50–80 mole percent of 4,4'-sulfonyldibenzoic acid and 50–20 mole percent of ω-hydroxy acid selected from the group consisting of glycolic acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

6. A copolyester obtained by the simultaneous coreaction of a polymethylene glycol containing 2–10 carbon atoms and acidic material consisting of 50–80 mole percent of 4,4'-sulfonyldibenzoic acid and 50–20 mole percent of hydroxypivalic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

7. A copolyester obtained by the simultaneous coreaction of a polymethylene glycol containing 2–10 carbon atoms, and acidic material consisting of 50–80 mole percent of 4,4'-sulfonyldibenzoic acid and 50–20 mole percent of 6-hydroxyhexanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

8. A copolyester obtained by the simultaneous coreaction of a polymethylene glycol containing 2–10 carbon atoms and acidic material consisting of 50–80 mole percent of 4,4'-sulfonyldibenzoic acid and 50–20 mole percent of glycolic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

9. A copolyester obtained by the simultaneous coreaction of a polymethylene glycol containing 2–10 carbon atoms, and acidic material consisting of 50–80 mole percent of 4,4'-sulfonyldibenzoic acid and 50–20 mole percent of 7-hydroxyheptanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

10. A copolyester obtained by the simultaneous coreaction of a polymethylene glycol containing 2–10 carbon atoms, and acidic material consisting of 50–80 mole percent of 4,4'-sulfonyldibenzoic acid and 50–20 mole percent of 9-hydroxynonanoic acid, said copolyester being spinnable and having a melting point of at least 200° C., said coreaction being effected at 180–300° C. to an inherent viscosity of at least 0.4 using an amount of glycol at least equivalent to the amount of said 4,4'-sulfonyldibenzoic acid.

11. A copolyester obtained by the simultaneous coreaction of pentamethylene glycol with acidic material consisting of 50–80 mole percent of 4,4'-sulfonyldibenzoic acid and 50–20 mole percent of 6-hydroxyhexanoic acid, said pentamethylene glycol and said 4,4'-sulfonyldibenzoic acid being combined in substantially equimolar proportions, said copolyester being spinnable and having a melting point of at least 200° C., said coreaction being effected at 180°–300° C. to an inherent viscosity of at least 0.4.

12. A copolyester obtained by the simultaneous coreaction of pentamethylene glycol with acid material consisting of 50–80 mole percent of 4,4'-sulfonyldibenzoic acid and 50–20 mole percent of hydroxypivalic acid, said pentamethylene glycol and said 4,4'-sulfonyldibenzoic acid being combined in substantially equimolar proportions, said copolyester being spinnable and having a melting point of at least 200° C., said coreaction being effected at 180°–300° C. to an inherent viscosity of at least 0.4.

13. Synthetic fiber having a sticking temperature of at least 200° C. and characterized by being readily dyeable, said fiber being formed from a copolyester obtained by the simultaneous coreaction of a glycol containing 2–12 carbon atoms, and acidic material consisting of 30–85 mole percent of 4,4'-sulfonyldibenzoic acid and 70–15 mole percent of ω-hydroxy acid selected from the group consisting of glycol acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid.

14. The method which comprises coreacting simultaneously at 180–300° C. to form a copolyester having an inherent viscosity of at least 0.4 a mixture of a glycol of 2–12 carbon atoms, 4,4'-sulfonyldibenzoic acid, and a ω-hydroxy acid selected from the group consisting of glycolic acid, hydroxypivalic acid, 6-hydroxyhexanoic acid, 7-hydroxyheptanoic acid, 8-hydroxyoctanoic acid, 9-hydroxynonanoic acid, 10-hydroxydecanoic acid and 11-hydroxyundecanoic acid, said glycol being present in an amount at least equivalent to said 4,4'-sulfonyldibenzoic acid.

15. The method which comprises forming a copolyester by coreacting simultaneously at 180°–300° C. to an inherent viscosity of at least 0.4 a mixture of 4,4'-sulfonyldibenzoic acid, a polymethylene glycol of 2–10 carbon atoms in an amount of at least equivalent to said 4,4'-sulfonyldibenzoic acid, and 15–70 mole percent of hydroxypivalic acid based on the combined weight of said 4,4'-sulfonyldibenzoic acid and said hydroxypivalic acid.

16. The method which comprises forming a copolyester by coreacting simultaneously at 180°–300° C. to an inherent viscosity of at least 0.4 a mixture of 4,4'-sulfonyldibenzoic acid, a polymethylene glycol of 2–10 carbon atoms in an amount at least equivalent to said 4,4'-sulfonyldibenzoic acid, and 15–70 mole percent of 6-hydroxyhexanoic acid based on the combined weight of said 4,4'-sulfonyldibenzoic acid and said 6-hydroxyhexanoic acid.

17. The method which comprises forming a copolyester by coreacting simultaneously at 180°–300° C. to an inherent viscosity of at least 0.4 a mixture of substantially equimolar proportions of polymethylene glycol containing 2–10 carbon atoms and 4,4'-sulfonyldibenzoic acid, and 20–50 mole percent of hydroxypivalic acid based on the combined amount of said 4,4'-sulfonyldibenzoic acid and said hydroxypivalic acid.

18. The method which comprises forming a copolyester by coreacting simultaneously at 180°–300°C. to an inherent viscosity of at least 0.4 a mixture of substantially equimolar proportions of polymethylene glycol containing 2–10 carbon atoms and 4,4'-sulfonyldibenzoic acid, and 20–50 mole percent of 6-hydroxyhexanoic acid based on the combined amount of said 4,4'-sulfonyldibenzoic acid and said 6-hydroxyhexanoic acid.

References Cited in the file of this patent

UNITED STATES PATENTS

| | | |
|---|---|---|
| 2,312,879 | Christ | Mar. 2, 1943 |
| 2,595,343 | Drewitt et al. | May 6, 1952 |
| 2,614,120 | Caldwell | Oct. 14, 1952 |
| 2,683,136 | Higgins | July 6, 1954 |